United States Patent [19]

Ansell et al.

[11] Patent Number: 4,530,089
[45] Date of Patent: Jul. 16, 1985

[54] TELECOMMUNICATIONS DIGITAL SWITCHBLOCK UTILIZING CONTROL SWITCH STATE MAPS

[75] Inventors: John W. Ansell; Thomas S. Maddern; Alexander S. Philip, all of Dorset, England

[73] Assignee: The Plessey Company plc, Ilford, England

[21] Appl. No.: 517,289

[22] Filed: Jul. 26, 1983

[30] Foreign Application Priority Data

Jul. 30, 1982 [GB] United Kingdom ............... 8222036

[51] Int. Cl.³ ............................................ H04Q 11/04
[52] U.S. Cl. ................................. 370/58; 179/18 ES
[58] Field of Search ................ 370/58, 66, 56; 179/18 ES

[56] References Cited

U.S. PATENT DOCUMENTS

| | | | |
|---|---|---|---|
| 3,754,100 | 8/1973 | Jacob | 179/15 AQ |
| 4,021,619 | 5/1977 | Potter et al. | 370/56 |
| 4,064,370 | 12/1977 | Coonce et al. | 370/58 |
| 4,068,098 | 1/1978 | Thyselius | 370/66 |
| 4,070,551 | 1/1978 | Weir | 370/56 |
| 4,317,193 | 2/1982 | Joel, Jr. | 370/58 |
| 4,333,175 | 6/1982 | Cook et al. | 370/56 |
| 4,428,042 | 1/1984 | Niethhammer et al. | 370/56 |
| 4,455,645 | 6/1984 | Mijioka et al. | 370/58 |
| 4,485,468 | 11/1984 | Slana | 370/58 |

FOREIGN PATENT DOCUMENTS 2083319A 3/1982 United Kingdom .

OTHER PUBLICATIONS

ICC 78, 1978 International Conference on Communications, Toronto, Canada; Jun. 4–7, 1978; "DMS 200 Traffic Peripherals"; Terry et al.; pp. 32.3.1–32.3.6.
Bell Laboratories Record, vol. 58, No. 8 (Sep. 1980); "Cross-Connections-DACS Makes Them Digital"; Colton; pp. 248–255.

Primary Examiner—Douglas W. Olms
Assistant Examiner—Frank M. Scutch, III
Attorney, Agent, or Firm—Fleit, Jacobson, Cohn & Price

[57] ABSTRACT

The digital switchblock includes a plurality of processor clusters which communicate via peripheral interface buffers with a number of controllers connected in serial configuration and which further communicate with the switchblock. The switchblock has a number of receive digital switching modules connected to incoming PCM transmission channels and a number of transmit digital switching modules connected to outgoing PCM transmission channels. The receive and transmit digital switching modules are interconnected by way of a plurality of control digital switching modules, to which are connected all controllers. The interconnection between one receive digital switching module and one transmit digital switching module is set up by way of one central digital switching module by use of a plurality of control switch state maps stored in the controllers. The maps depict the current state of all digital switching modules and identify a connection path through the switchblock.

6 Claims, 27 Drawing Figures

DUPLEX PATH ALGORITHM $x \leftrightarrow x'$
$y \leftrightarrow y'$

3072 DLTS

3072 DLTS

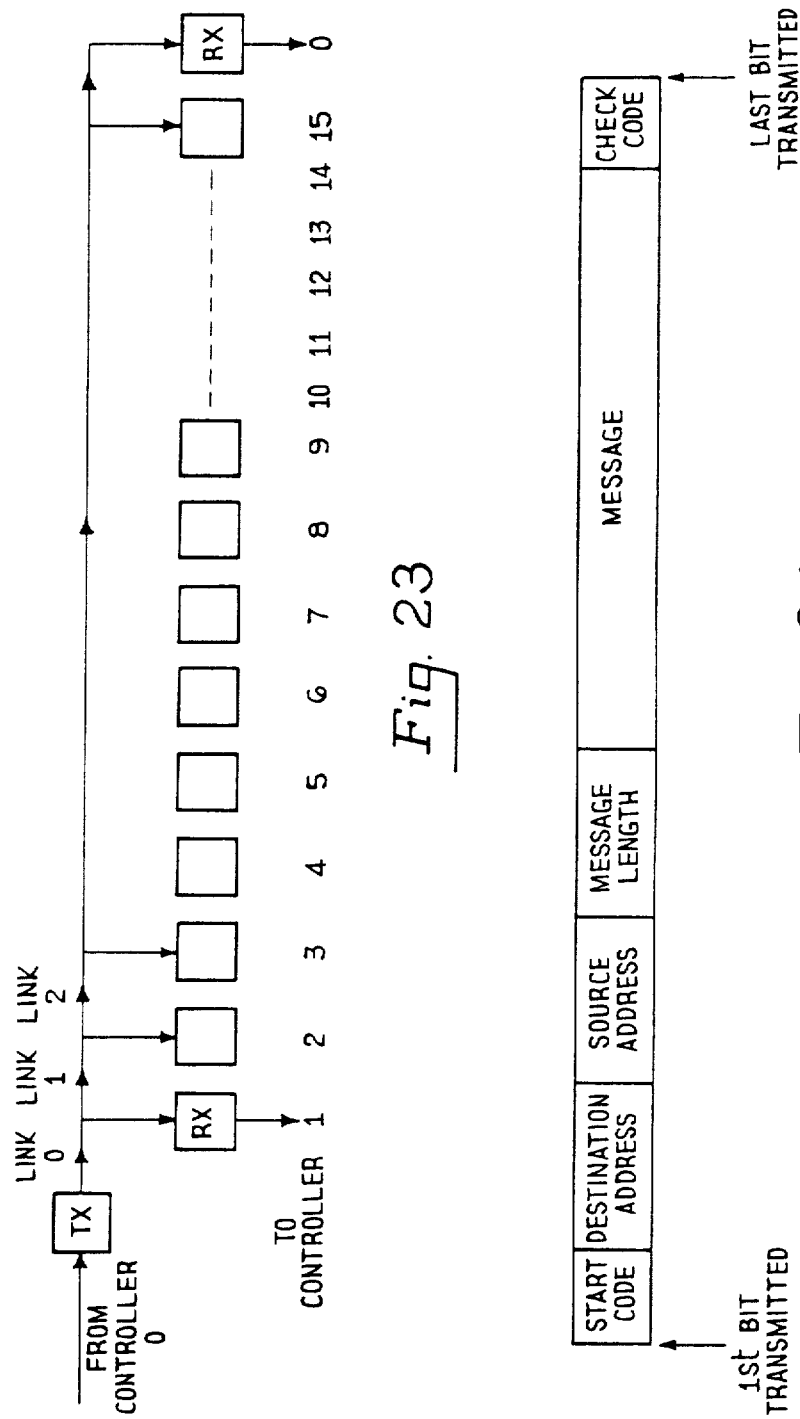

TELECOMMUNICATIONS DIGITAL SWITCHBLOCK UTILIZING CONTROL SWITCH STATE MAPS

The present invention relates to a telecommunications digital switchblock and the control of the switchblock in the telecommunications environment.

Digital switchblocks which are currently in use become uneconomic as changes in large scale integration LSI technology occur. There is a constant requirement for an improved demand throughput of the switchblock together with cost reduction demands on manufacture and maintenance, and a demand for improved reliability.

The digital switchblock is composed of a number of digital switching modules each of which is arranged as an LSI device providing digital PCM switching in a space-time-space format. The module is unidirectional in operation and is capable of switching digitally coded speech from any incoming channel to any outgoing channel. The module can be programmed to permit combinations of parallel or serial operation at its input interfaces. The switching configuration of input channels to output channels is held within the module and can be amended by messages sent along a serial control interface. A more detailed description of the digital switching module is disclosed in British patent application No. 2083319A.

An aim of the present invention is to provide a digital switchblock which can provide an improved demand throughput in a cost effective manner with improved reliability of operation.

According to the present invention there is provided a digital switchblock for use in telecommunications equipment including a plurality of processor clusters which communicate via peripheral interface buffers with a plurality of controllers connected in serial configuration and which further communicate with the digital switchblock, said switchblock comprising a plurality of receive digital switching modules connected to incoming PCM transmission channels, and a plurality of transmit digital switching modules connected to outgoing PCM transmission channels, said receive and transmit digital switching modules being interconnected by way of a plurality of central digital switching modules, to which are connected all controllers, the interconnection between one receive digital switching module and one transmit digital switching module being set up by way of one central digital switching module by use of a plurality of control switch state maps stored in the controllers, which depict the current state of all digital switching modules and identify a connection path through the digital switchblock.

An embodiment of the present invention will now be described with reference to the accompanying drawing wherein.

Figure 17:
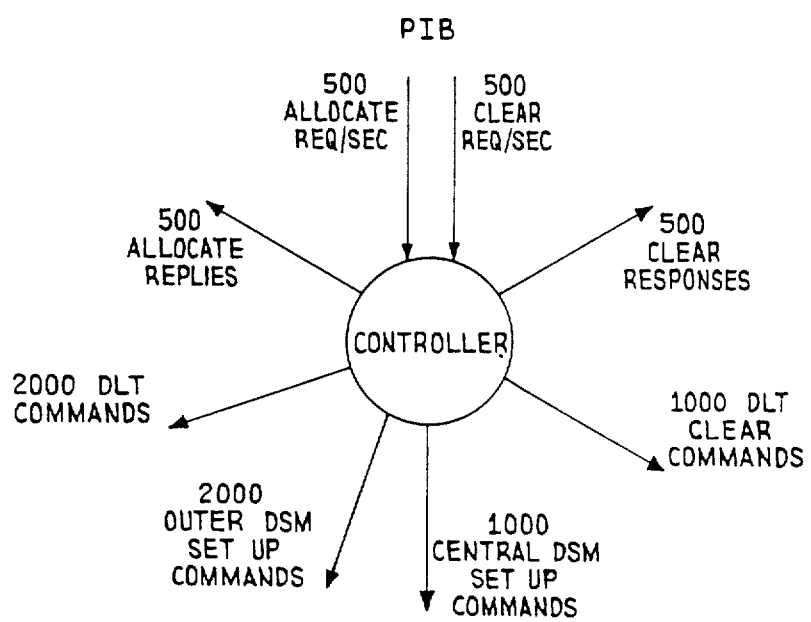
Figure 9:
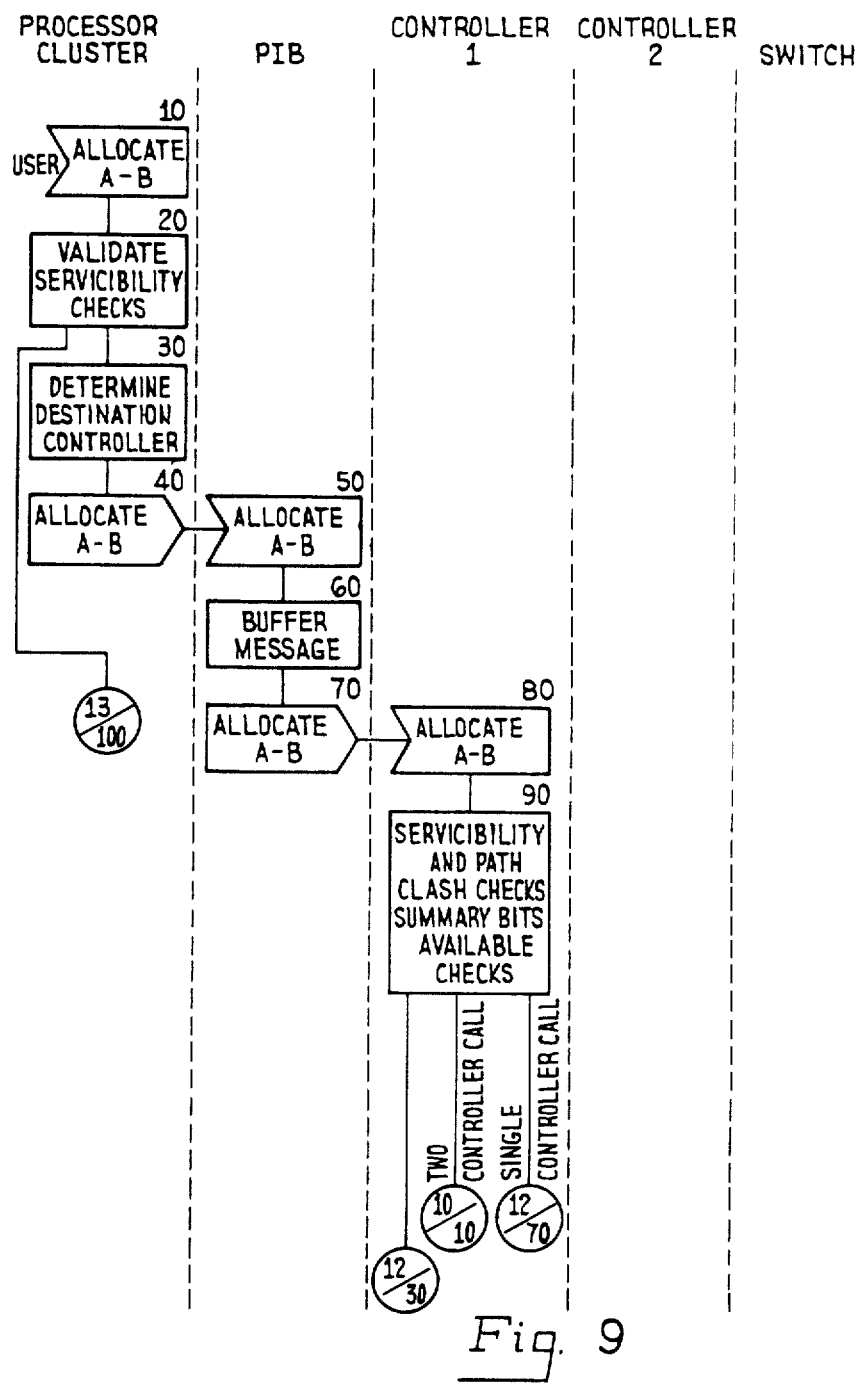
Figure 10:
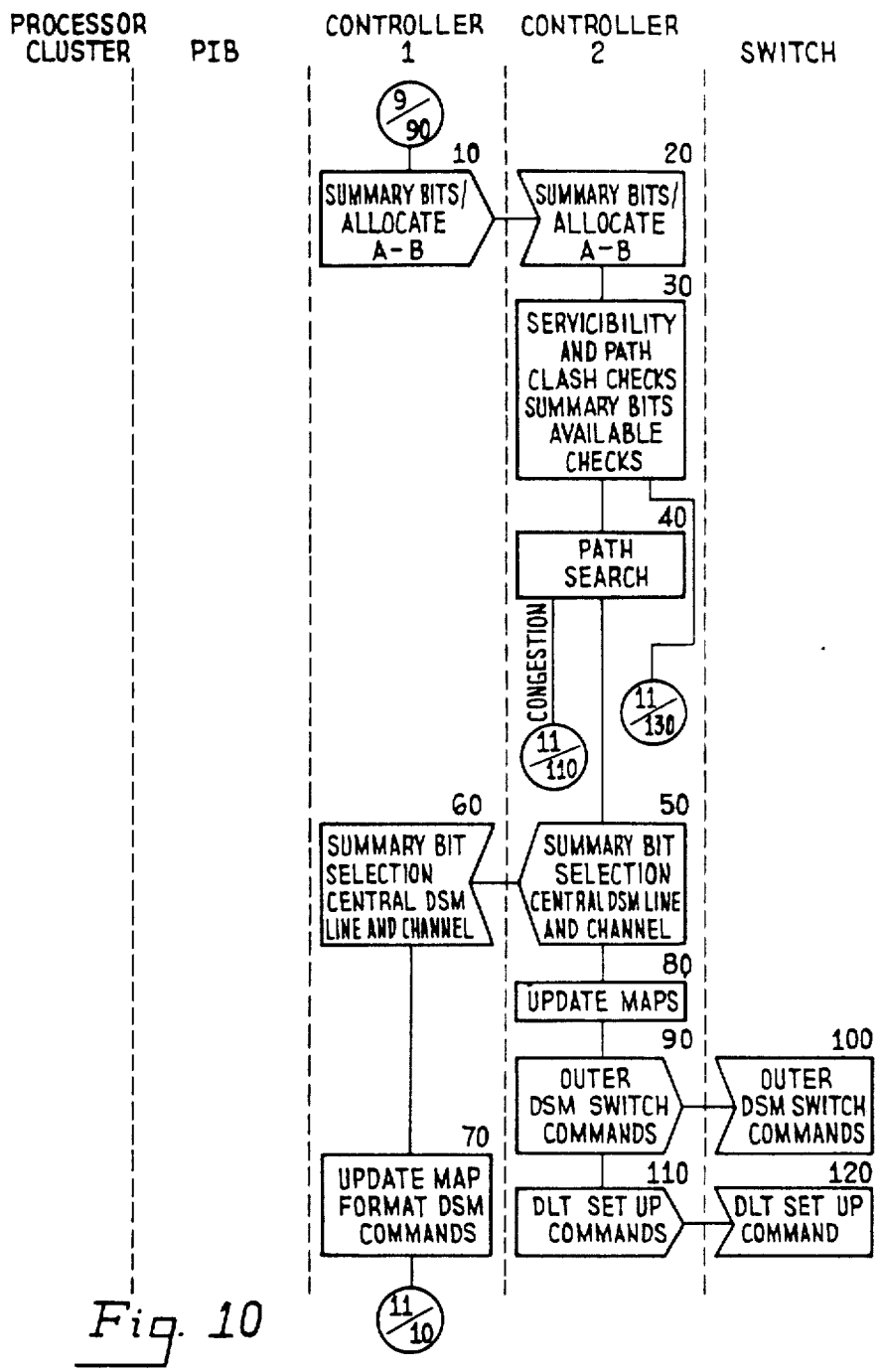
Figure 11:
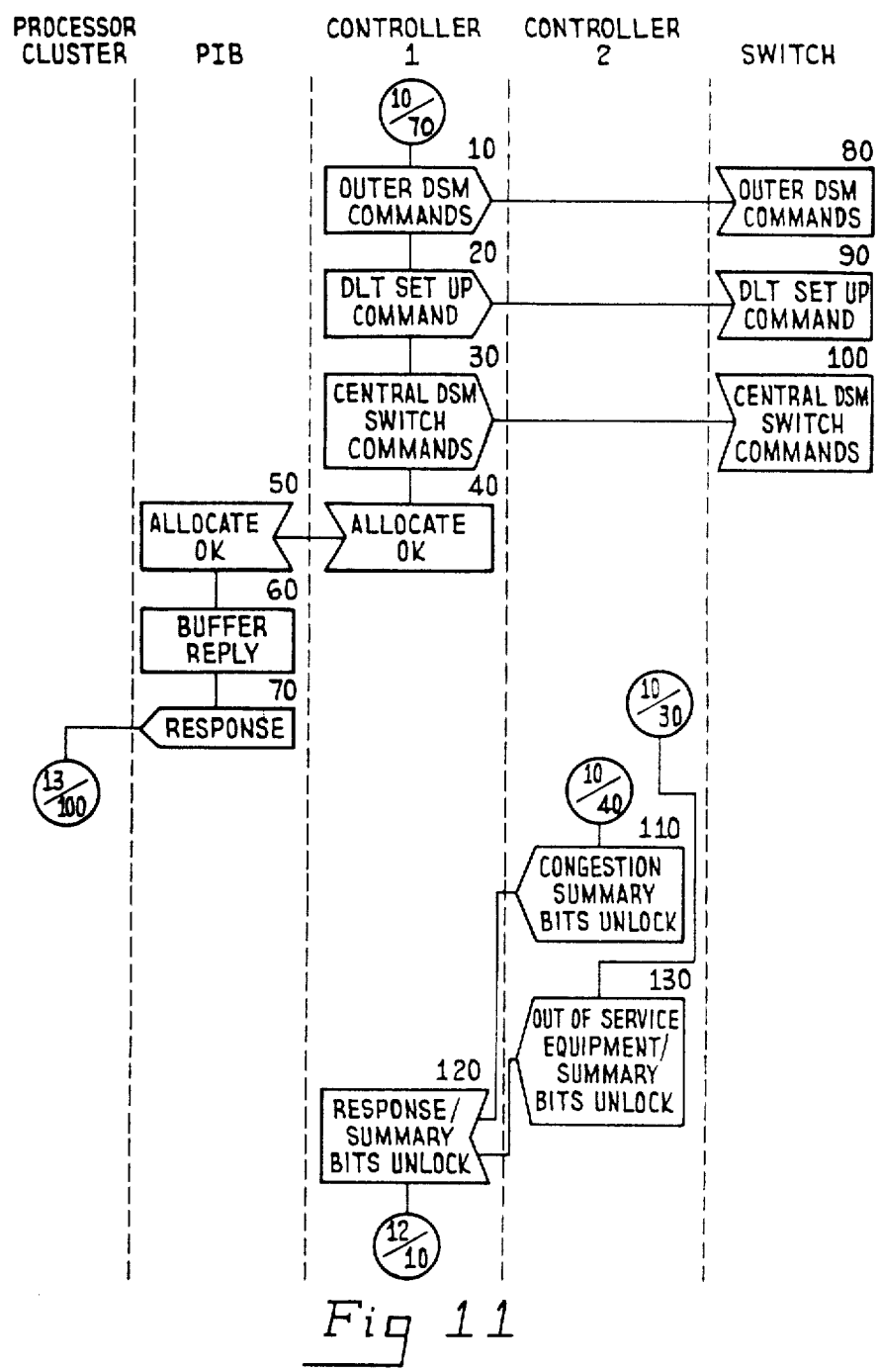
Figure 12:
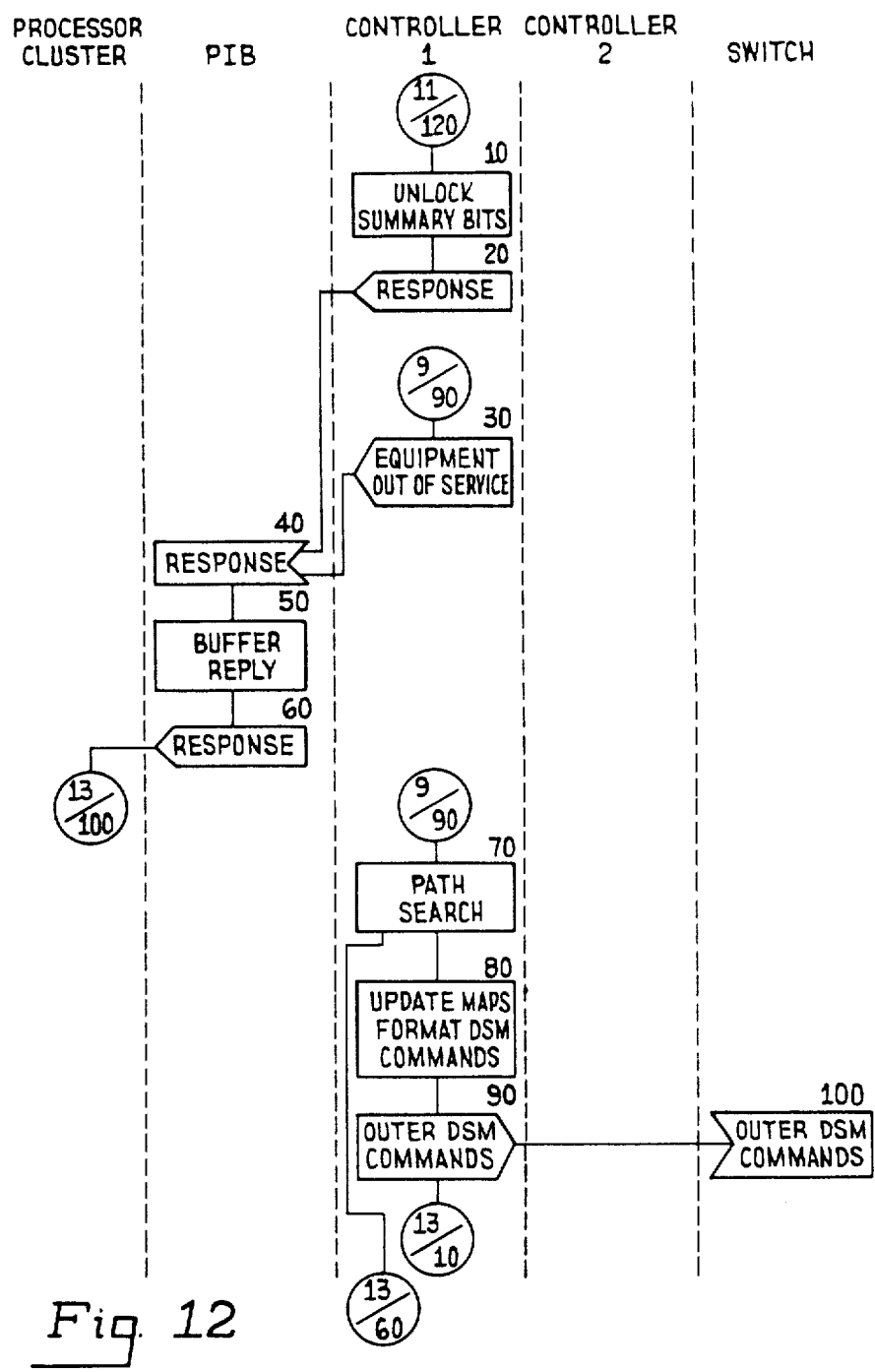
Figure 13:
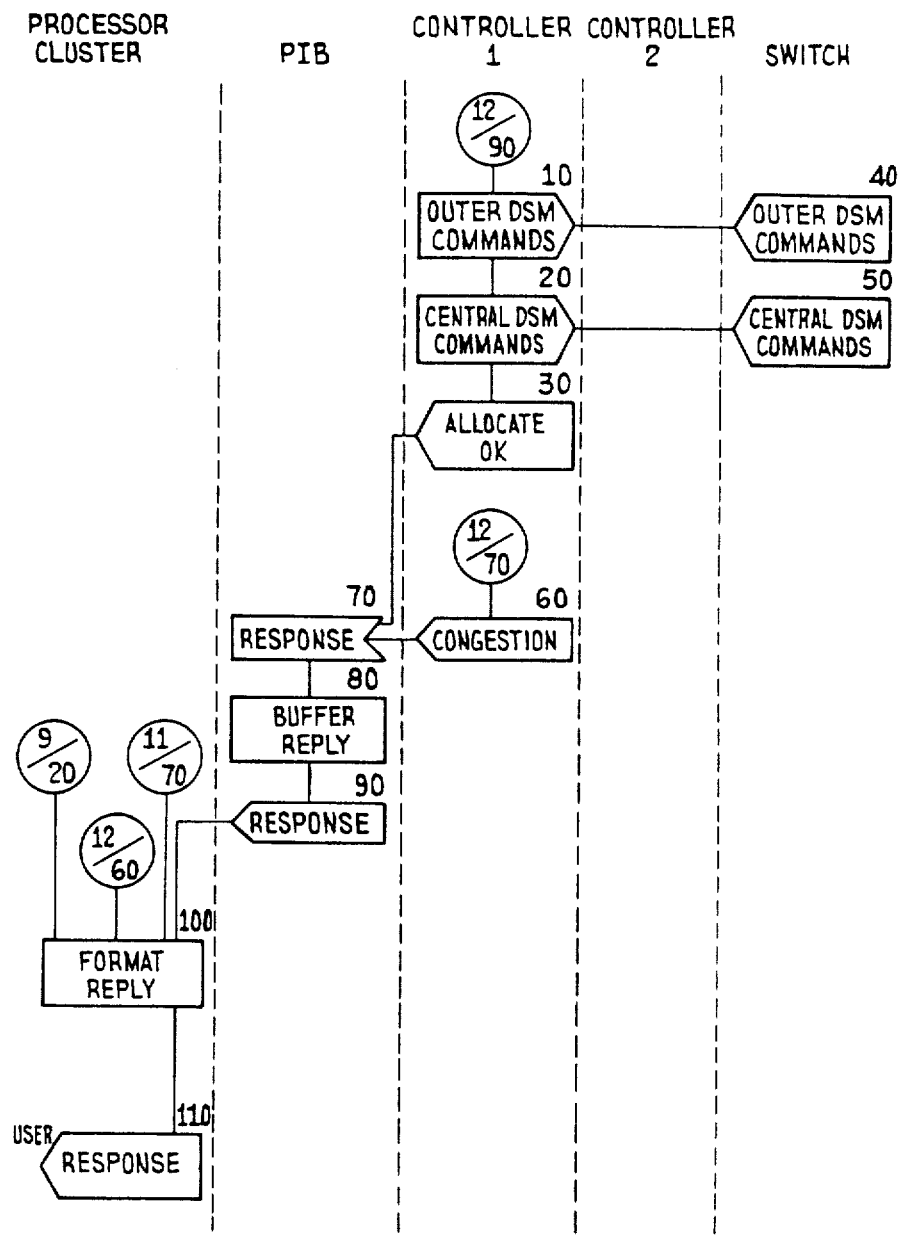
Figure 14:
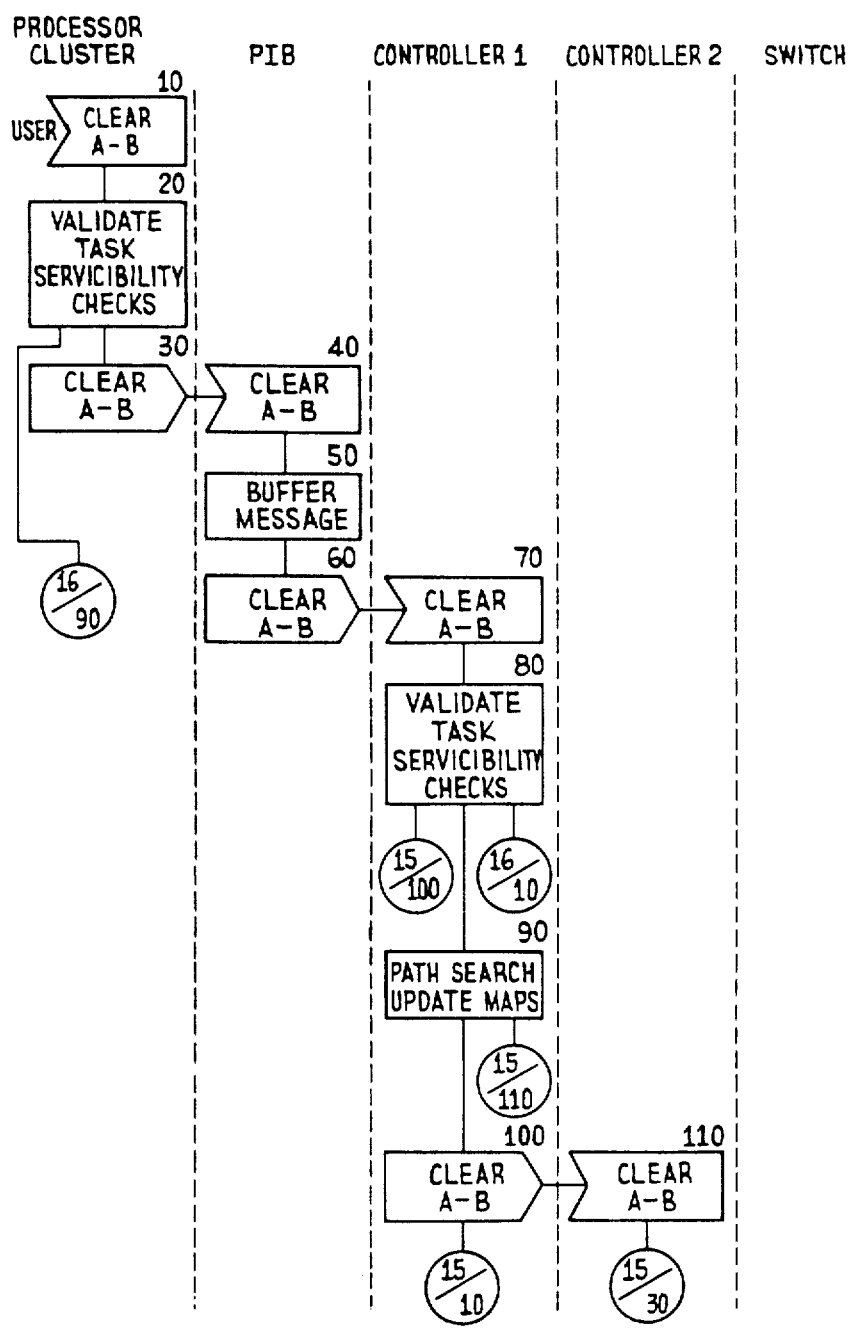
Figure 15:
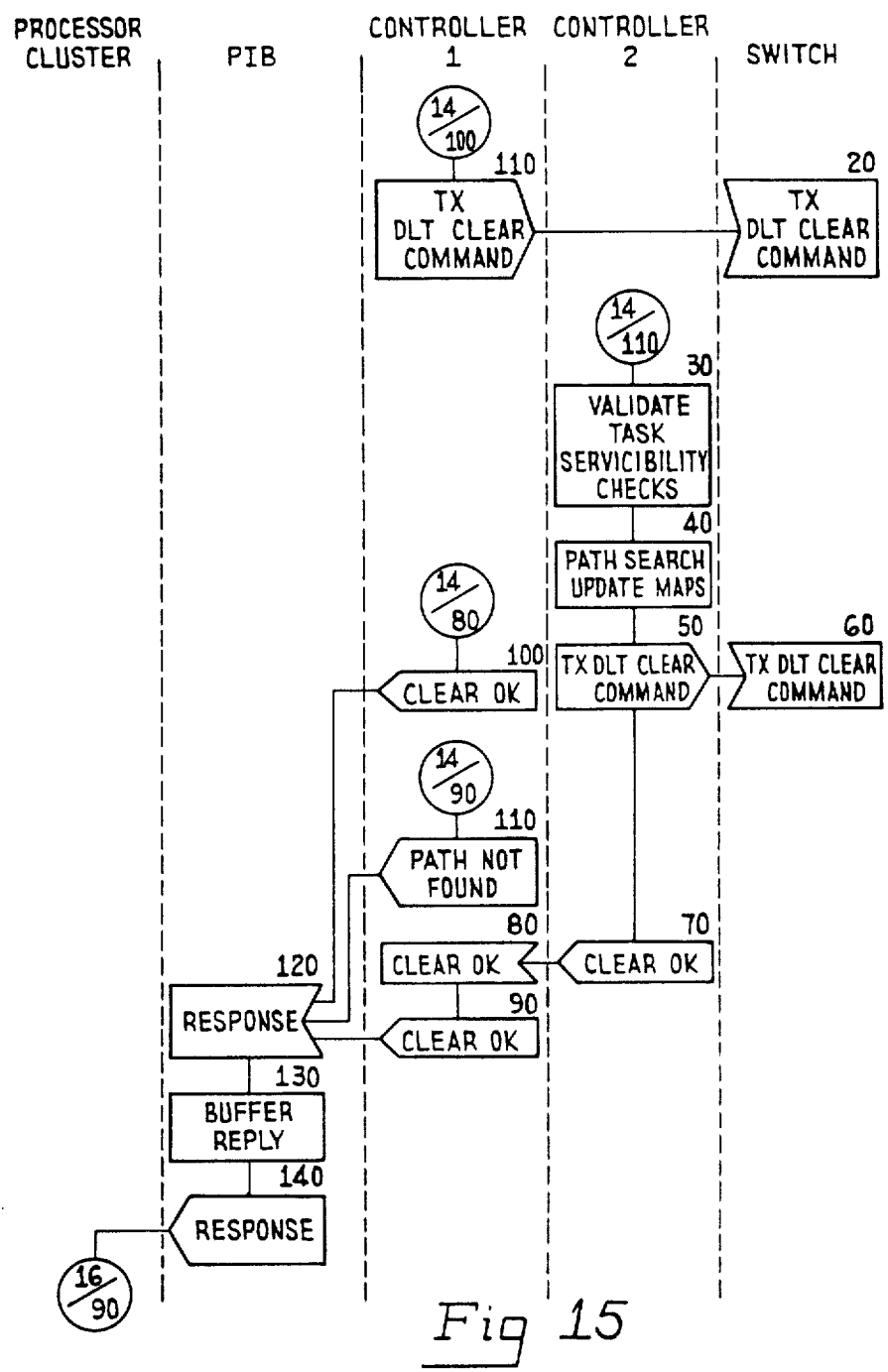
Figure 16:
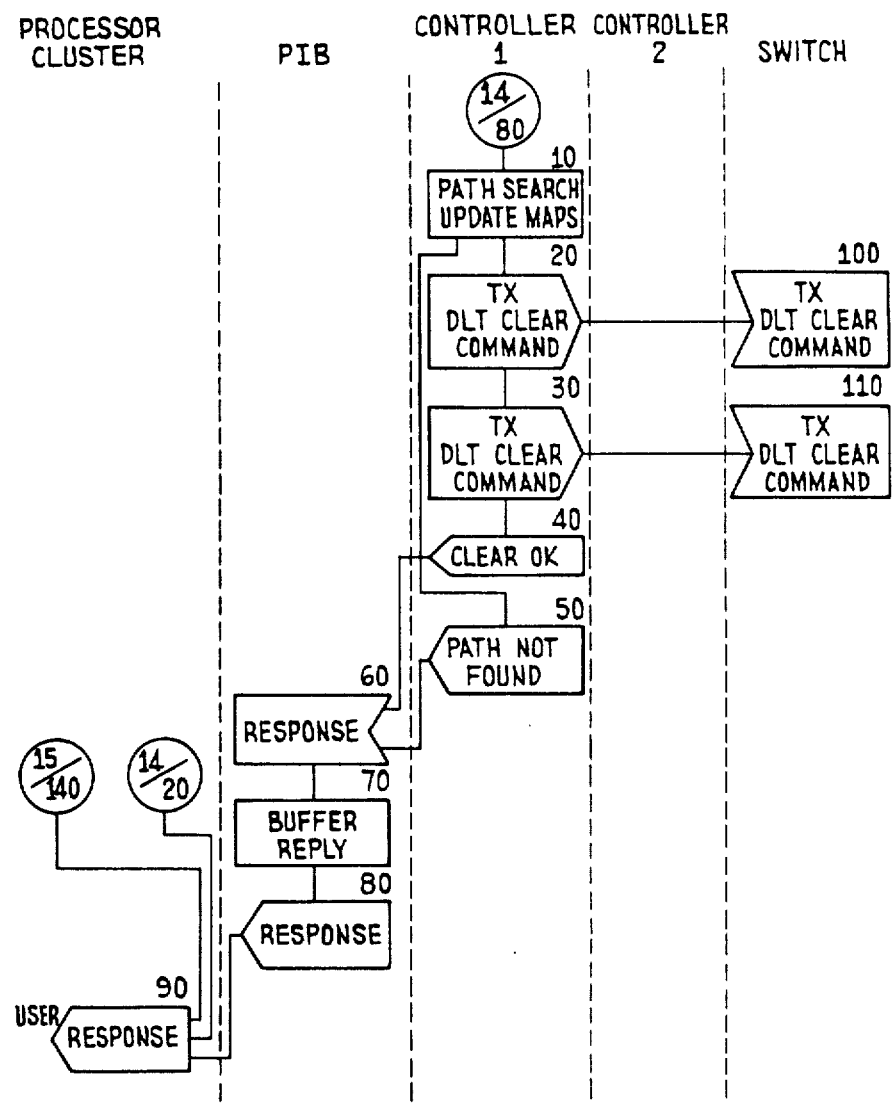
Figure 18:
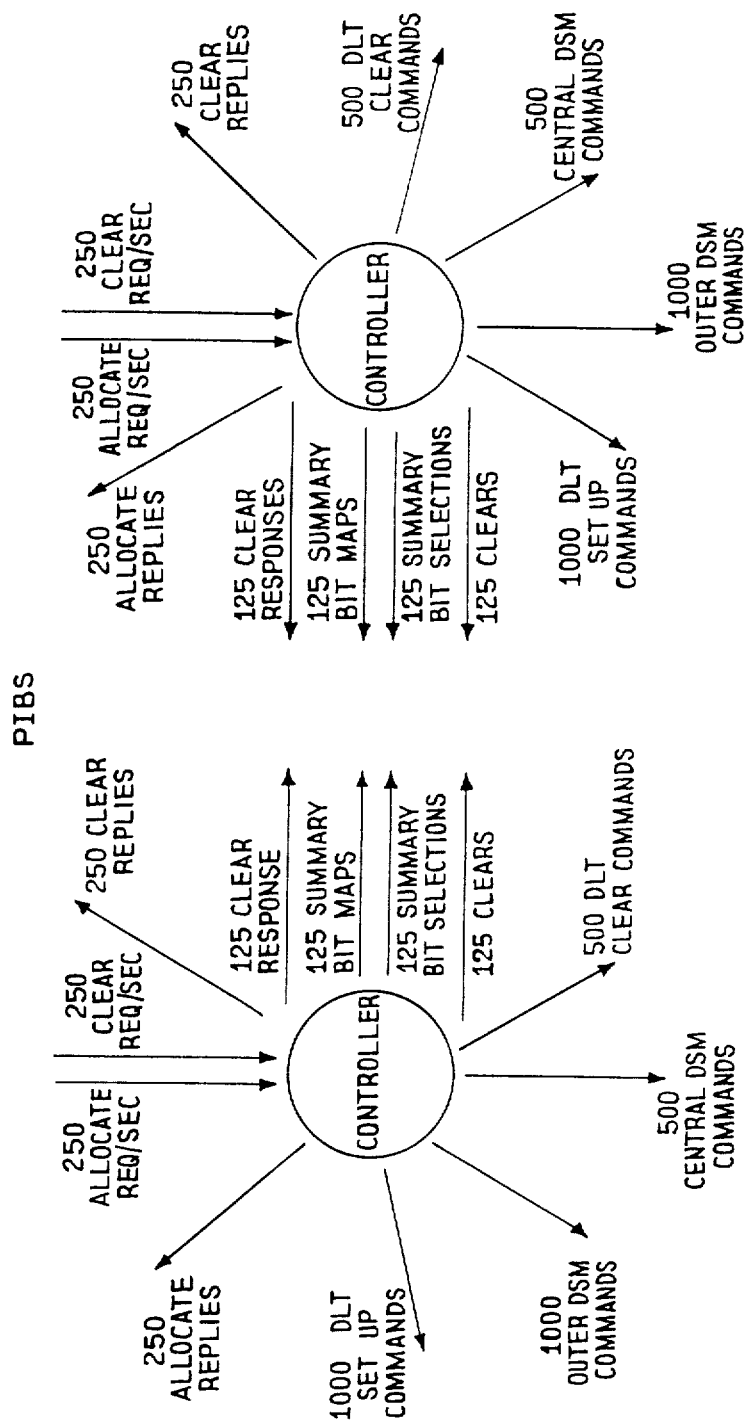
Figure 25:
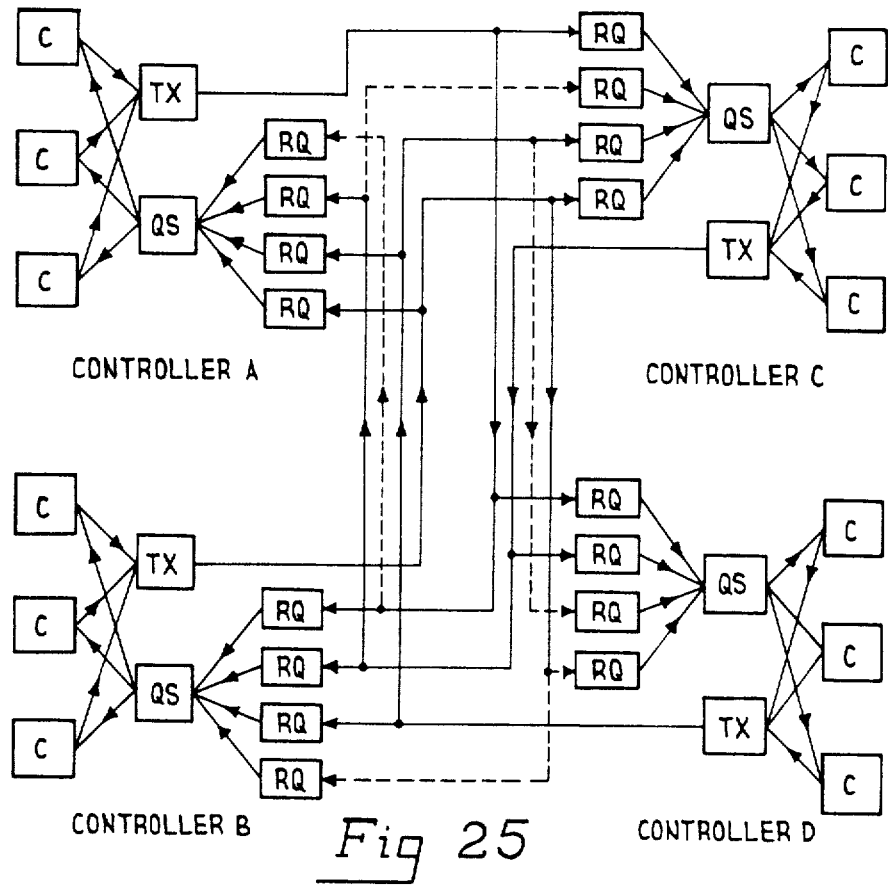
Figures 19, 20:
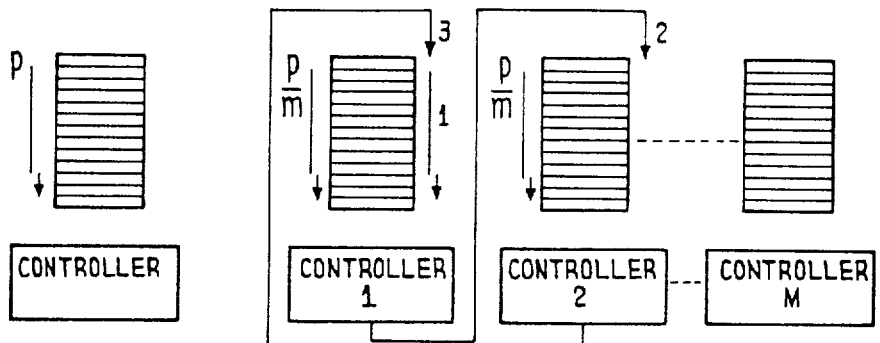
Figure 21:
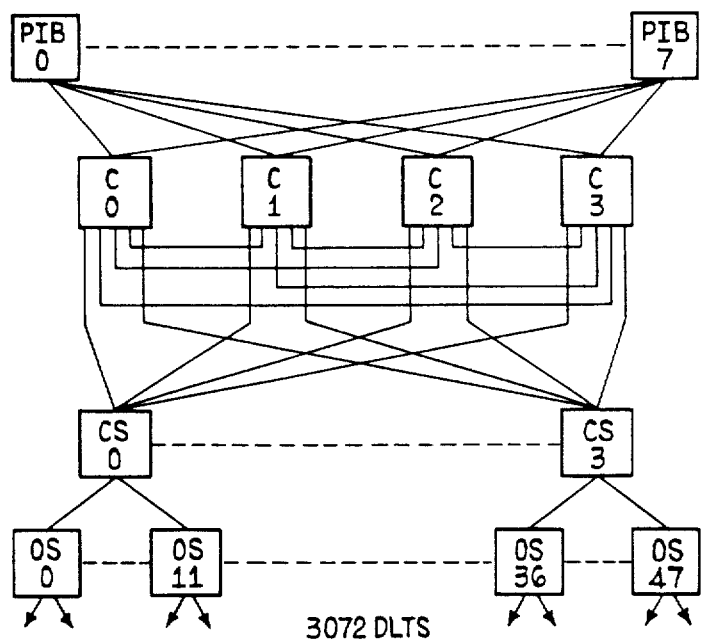
Figure 22:
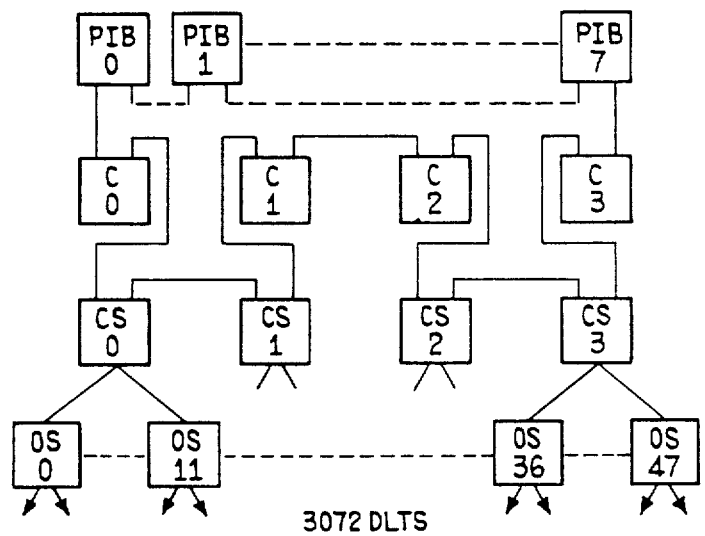
Figure 26:
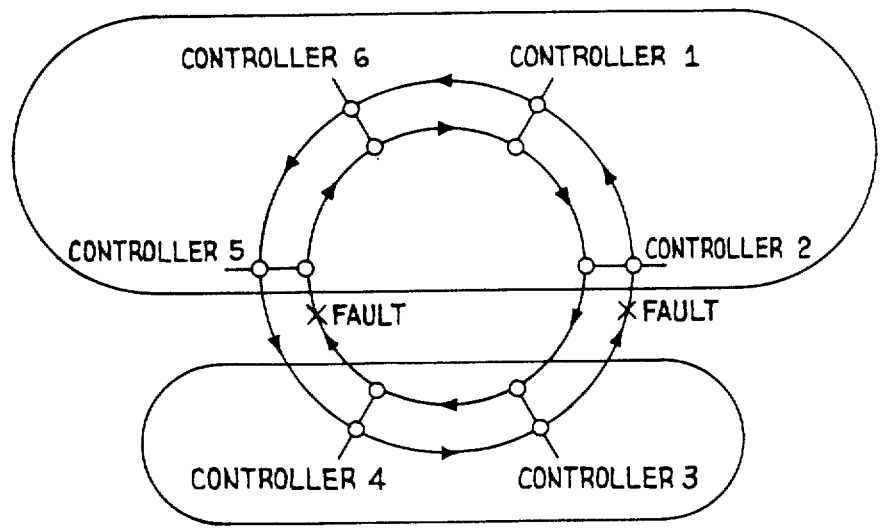
Figure 27:
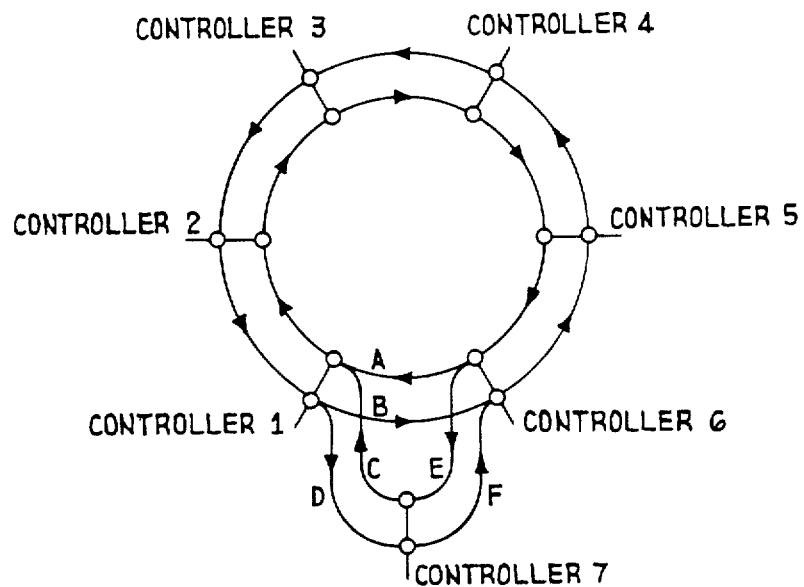

FIGS. 9–16 show flow and message sequences performed in a multicontroller system, FIG. 17 shows the message flow for a single controller, FIG. 18 shows the message flow for two controllers, FIGS. 19 and 20 show the queuing overheads for a single and multicontroller system respectively, FIG. 21 shows typical communication paths required by the control function, FIG. 22 shows communication paths required by the control function using a loop, FIGS. 23 and 24 show a broadcast communication link and the message format respectively, FIG. 25 shows a control highway, FIG. 26 shows the effect of a fault in both communication loops; and, FIG. 27 shows how a further controller can be added to the loop.

Figure 1:
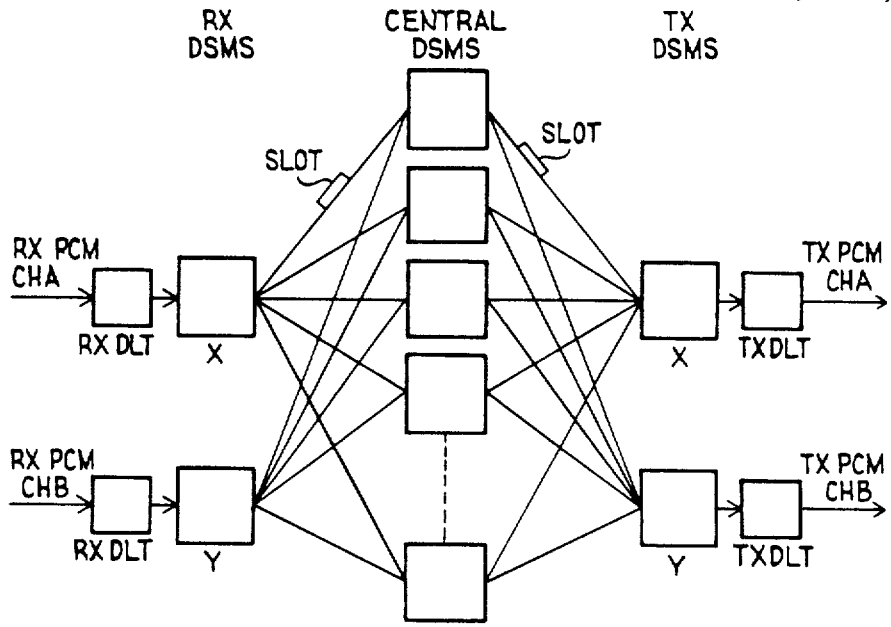
FIG. 1 shows a conceptual diagram of a switchblock.

Referring to FIG. 1 two pairs of outer digital switching modules DSMs, Rx and Tx DSM X, and Rx and Tx DSM Y are shown together with the central digital switching modules, DSMs. There are eight speech channels between each outer digital switching module DSM and each central digital switching module DSM, making 512 in all. These channels are known as slots. One slot carries the data of one pulse code modulated channel PCM CH (Rx or Tx) to or from the central digital switching modules DSMs. A pulse code modulated channel PCM CH may only use the slots of the outer digital switching module DSM to which it is connected.

Figure 2:
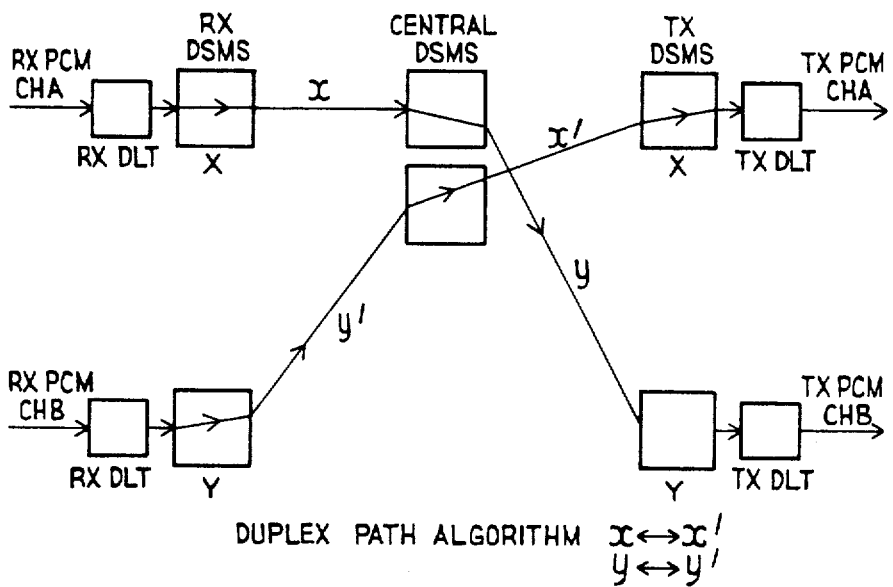
FIG. 2 shows a duplex path through the switchblock shown in FIG. 1.

Referring to FIG. 2 a duplex path is shown set up between PCM channel A, PCM CH A and PCM channel B, PCM CH B. There are six digital switching modules, DSMs involved in all. The slots x, x', y, y' must be chosen so that x and y meet at a central digital switching module DSM, and similarly for x' and y'.

The four slots are arbitary, and the control system must find four such slots satisfying the above two conditions. This control system process is known as path search.

To greatly simplify, and hence speed up path search, the simplex paths, making up a duplex path, are constrained to bear a fixed relation between each other. This simplification is accomplished by placing the slots of an Rx outer digital switching module in one to one correspondence with the slots of the Tx outer digital switching module with which it is paired. This one to one correspondence is known as the duplex path correlation function. It guarantees the availability of a Tx outer digital switching module slot, if its corresponding Rx outer digital switching module slot is free. Thus if one direction of a duplex path can be made then the other direction can be connected.

The two slots, x and x', are the 'first' and 'second' halves of two different simplex paths, which help form a duplex path. Using the duplex path correlation function, path search is reduced to finding two free Rx slots (e.g. x and y of FIG. 2). A duplex path is then guaranteed by the way x' and y' are chosen and the way in which they relate to the duplex path correlation function.

The control system must perform two operations to set up a call in the switch.

Operation I:

On receipt of a switch request the control system must examine the switch state and find four slots which form a duplex path.

Operation II:

It must assemble and output six digital switching module commands to set up the path. (There are other ancillary commands, but they are not described here). Operation I is accomplished by the use of control switch-state maps.

The use of switch maps enables both the examination of the switch state and path search to be done in a few hundred microseconds.

By virtue of the duplex path correlation function, the maps of an Rx outer digital switching module and its corresponding Tx outer digital switching module are almost identical and so they are incorporated into one group of maps. There are three maps in the group in all:

i. Summary bit map
ii. A PCM channel ordered map
iii. A slot ordered map

There are no central digital switching module maps since their digital switching module states may be inferred from the outer digital switching module states.

Summary bit map

There is one summary bit map for each Rx and Tx digital switching module pair. It states in the most concise form possible, the busy free (idle) states of routes between these digital switching modules and the central digital switching modules. There is one summary bit for the route to each central digital switching module. It is set to busy if there are no slots available to the central digital switching module, otherwise it is set to free.

There are sixty-four central digital switching modules and therefore sixty-four summary bits. The sixty-four summary bits are the summary bit map of the Rx and Tx digital switching module pair.

Figure 3:
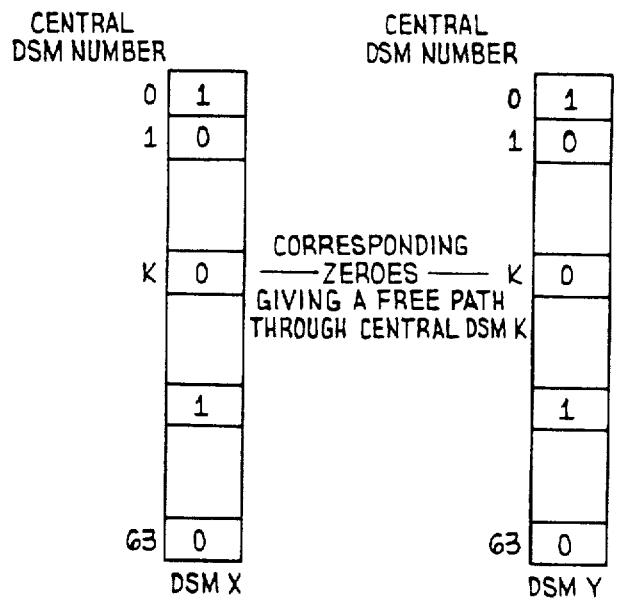
FIG. 3 shows a summary bit map for a digital switching module X and a digital switching module Y.

The summary bit maps are used to perform path search. The summary bit map of the two Rx and Tx digital switching module pairs are compared and paths are given by the corresponding central digital switching modules being 'free' as shown in FIG. 3.

ii. PCM channel ordered map

Figure 4:
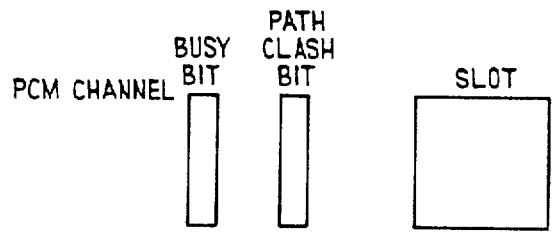
FIG. 4 shows a PCM channel ordered map for an outer digital switching module.

Three pieces of information are stored at each PCM channel location; as shown in FIG. 4.

a. A busy bit indicating whether the PCM channel is in use.
b. The slot the PCM channel is using.
c. A path clash on collision bit indicating whether it is possible for path clash to take place if one further path is connected to the PCM channel.

The path clash bit is equivalent to the busy bit if all paths are fully enabled. Both bits are required only if a multiple connection facility is to be channel implemented which broadcasts from one input to several output channels. In that case some paths will be reserved (e.g. return path to a timeslot 16 box) and it becomes necessary to distinguish between a PCM channel being in use (busy bit set) and path clash possible (path clash bit set).

iii. Slot ordered map

Figure 5:
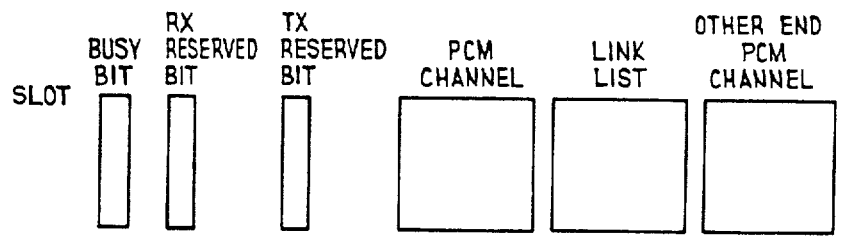
FIG. 5 shows a slot ordered map for an outer digital switching module.

At each slot location five pieces of information are kept, as shown in FIG. 5.

a. A busy bit indicating whether the slot is in use.
b. The PCM channel the slot is being used by.
c. The PCM channel connected at the other end of the path.
d. Two reserved bits indicating whether the go and return paths are reserved or enabled.
e. Link list (used only for multiple connections and broadcasting).

Switch maps in the controller data area are very flexible to implement, e.g. the addition of the reserved bits to simplify a trace request. The maps can be reorganised to introduce any new facilities that the switch architecture can accommodate or simplified should any facility be unwanted. By adjusting the way the maps are stored it is possible to simplify and speed up processing. This technique can be employed for the path search algorithm and the packing algorithm for example.

The security of the switch maps are conferred by the security of the controllers. The controllers are triplicated and a single fault in a switch map will not cause the control system to act incorrectly. Moreover any fault in the switch map will show up at a majority voter when a request is performed involving the faulty area.

The use of these switch maps give short processing periods because they centralise switch state information, and simplify its processing and obviate digital switching module interrogation with its entailed processing overheads.

Typically the estimated processing periods for allocate and clear requests in a realisation of the switch are as follows:

Allocate request = 1.2 ms
Clear request = 0.8 ms

These figures are for a multicontroller environment. They are marginally shorter for a single controller.

THE CONTROL SYSTEM COMMUNICATION NETWORK

Figure 6:
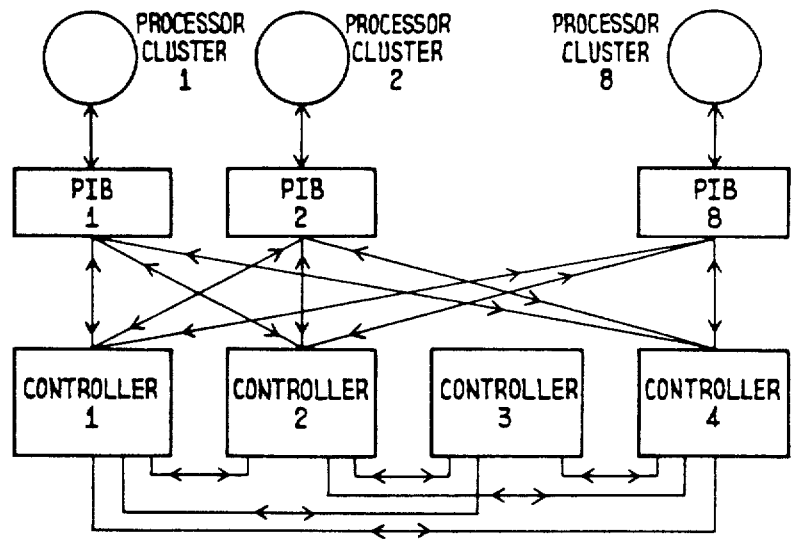
FIG. 6 shows a control system communication network.

FIG. 6 shows the control system in more detail.

There are four controllers in the largest system and eight processor clusters each with its own peripheral interface buffer, PIB, which can send or receive a message from any controller.

CONTROLLER-SWITCHBLOCK COMMUNICATION NETWORK

Figure 7:
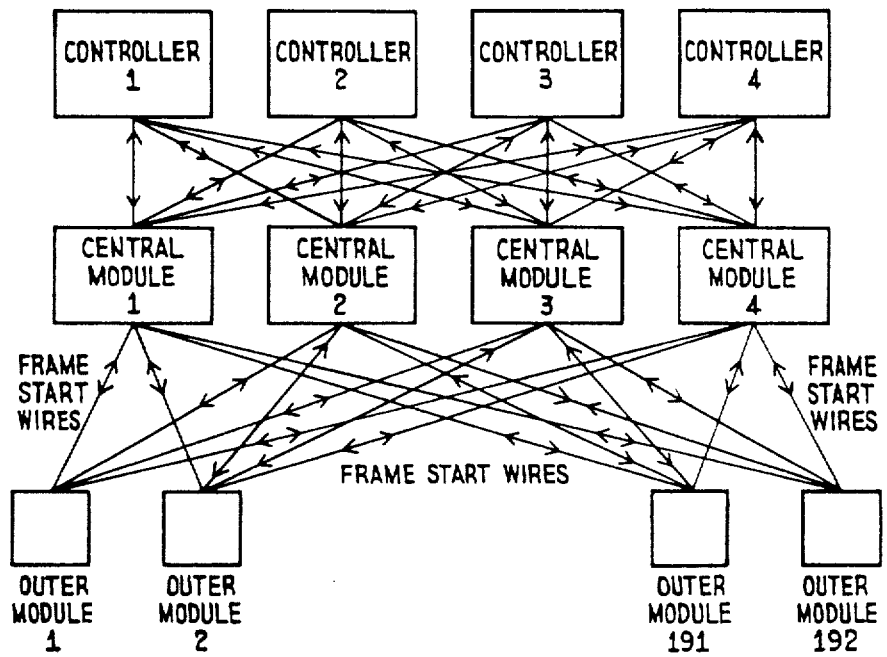
FIG. 7 shows a controller switchblock communication network.

FIG. 7 shows how the controllers communicate with the switchblock. It can be seen that any controller can send or receive messages from any central module directly. Messages for the outer digital switching modules go through the central stage trunking and out along the frame start wires. Messages from the outer digital switching modules follow that route in reverse. Although the communication line is bidirectional, the frame start wires are unidirectional. So, in fact, messages from the central modules to the outer modules go along frame start wires outgoing from the central modules, and messages to the central modules from the outer modules go along incoming frame start wires.

CONTENTION DURING PATH SEARCH

More than one controller has read/write access to the summary bit map of any outer digital switching module. Two controllers cannot be allowed to choose the same slot at the same time. To prevent this only one controller is allowed to have read/write access to perform an allocate, at any one time. Further controllers are prevented from gaining access by a software 'lock' in the controller responsible for a given set of maps. The 'lock' is set when the summary bit map is being used for an allocate and reset when the summary bit map is returned. Whenever a controller wants to use the summary bit map for an allocate, its availability is checked first.

SUMMARY BIT MAP LOCK-UP

Figure 8:
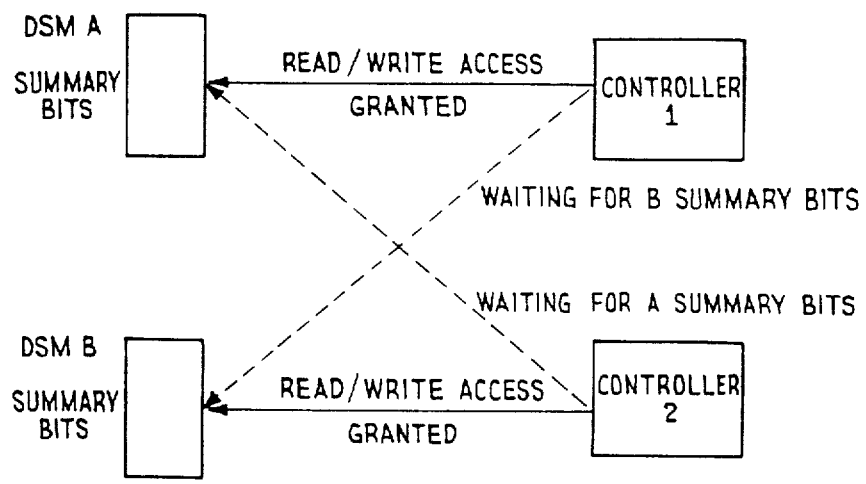
FIG. 8 shows contention between controllers during path search.

The software 'lock' on the summary bits can lead to a further problem. Two controllers executing an allocate request between the same two digital switching modules may each get and have locked only one summary bit map of the two digital switching modules. Each controller will have read/write access to one summary bit map and will be waiting for the release of the other map so that it can begin path search. Neither will release and so the summary bit maps will be unavailable indefinitely. An example of this problem is overcome by allowing summary bit maps to only be obtained in a specific order of priority, for example the summary bit map of the highest numbered digital switching module is obtained first. Only after the summary bit map of the highest priority has been obtained can a controller proceed to access the second map. Referring again to FIG. 8 controller 1 has the summary bits for digital switching module A and wants the summary bits for digital switching module B. Controller 2 has the summary bits for digital switching module B and wants the summary bits for digital switching module A. This is a lock up condition. To prevent lock up both controllers request the summary bits of digital switching module A first, assuming controller 1 will succeed and it then continues and obtains the summary bits for digital switching module B while controller 2 waits for release of digital switching module A, this is shown in FIG. 8.

To make the allocate message sequence as short as possible, the allocate switch request is routed by the processor cluster to go to the controller responsible for the highest numbered digital switching module which holds the maps of the highest priority locally.

To obtain evenly distributed allocate processing loads, the high numbered and low numbered digital switching modules are equally shared out amongst the controllers.

The control operation is shown in the flow message sequences of FIGS. 9-16 depicting how an allocate request and a clear request are performed in a multicontroller system.

Using the message/flow charts, message flow diagrams as shown in FIGS. 17 and 18 can be derived for a single controller and a two controller system respectively. The figures show the average number of messages flowing in and out of the controllers for 1,000 switch request per second. By breaking down the messages, an estimate of the communication band-width needed is obtained.

Estimates of controller instruction times lead into a comparison of the throughput of the two systems very high throughput can be achieved using multiple controllers.

TABLE 1
Message Composition.

Allocate request
Header
Function: Allocate
Parameters: PCM CHA, PCM CHB, A→B, B→A, (A→B, B→A are the reserved bits.)
Checksum Approximate message length 8 words
Summary bit map/allocate
Header
Function: Summary bit map/allocate
Parameters: PCM CHA, PCM CHB, A→B, B→A TABLE 1-continued
Message Composition.

Checksum Approximate message length 10 words
Summary bit selection
Header
Function: Summary bit selection
Parameters: PCM CHA, PCM CHB, A→B, B→A, response
Checksum Approximate message length 8 words
Central DSM command
Header
Function: Set-up
Parameters: Central DSM number, Central DSM line, Central DSM channel, Central DSM line, Central DSM channel
Checksum Approximate message length 6 words
Clear command (controller-controller)
Header
Function: Clear
Parameters: PCM CHA, PCM CHB, A→B, B→A
Checksum Approximate message length 8 words
Clear response (controller-controller)
Header
Function: Clear
Parameters: PCM CHA, PCM CHB, A→B, B→A, response
Checksum Approximate message length 8 words
Digital line terminations, DLT clear command
Header
Function: Clear
Parameters: Channel number, PLANE 0 MASK, PLANE 1 MASK
Checksum Approximate message length 4 words
Clear reply
Header
Function: Clear
Parameters: PCM CHA, PCM CHB, A→B, B→A, response
Checksum Approximate message length 8 words
Outer DSM command
Header
Function: Set-up
Parameters: DSM number, PCM line, PCM channel, slot number
Checksum Approximate message length 6 words
Digital line termination, DLT set-up command
Header
Function: Set-up
Parameters: Channel number, PLANE 0 MASK, PLANE 1 MASK
Checksum Approximate message length 4 words
Allocate reply
Header
Function: Allocate
Parameters: PCM CHA, PCM CHB, A→B, B→A, response
Checksum Approximate message length 8 words
Clear request
Header
Function: Clear
Parameters: PCM CHA, PCM CHB, A→B, B→A, (A→B, B→A, are the reserved bits)
Checksum Approximate message length 8 words

MESSAGE BANDWIDTH

The message compositions are given in table 1. Against each message is an estimate of its length, with these values an estimate can be made of the bandwidth required in the two systems both in and out.

Single controller system
Messages in: $10^3 \times 8 \times 16$ bits/sec = $1.28 \times 10^5$ bits/sec
Messages out: $10^3 \times 8 \times 16 + 2 \times 10^3 \times 4 \times 16 + 2 \times 10^3 \times 6 \times 16 + 1 \times 10^3 \times 6 \times 16 + 10^3 \times 4 \times 16 =$ $6.72 \times 10^5$ bits/sec
Two controller systems
For one controller

```
-continued
Messages in:   250 × 8 × 16 + 250 × 8 × 16 +
               125 × 8 × 16 + 125 × 10 × 16 +
               125 × 8 × 16 + 125 × 8 × 16 =
               1.32 × 10⁵ bit/sec
Messages out:  10³ × 4 × 16 + 10³ × 6 × 16 + 500 × 6 ×
               16 +
               500 × 4 × 16 + 125 × 6 + 125 × 10 ×
               16 +
               125 × 8 × 16 + 125 × 6 × 16 + 250 ×
               8 × 16 +
               250 × 8 × 16 = 3.64 × 10⁵ bit/sec
```

These values show that the message bandwidth into controller is roughly the same for each system and the bandwidth out of a controller is just over half the bandwidth out of a single controller.

If more controllers are added to the system the bandwidth in and out of a controller decreases.

The interfaces in and out of a controller will operate at 2 Mb/s and in a multicontroller environment the amount of bandwidth used will be of the order of 20% of that available.

MESSAGE FLOW THROUGH THE CONTROLLERS

FIGS. 17 and 18 show the flow messages of a one controller and two controller system. The values are mean rates under even traffic loads. The breakdown of messages for the two controller systems has been obtained from the message flowcharts.

SINGLE CONTROLLER SYSTEM THROUGHPUT

Let
A = mean service time for an allocate switch request in milliseconds
C = mean service time for a clear switch request in milliseconds The absolute maximum throughput is given by: 2000/(A+C) req/sec, assuming allocate and clear request are in the ratio 1:1 over long periods of time.

For a single controller the processing periods are estimated to be:

A = 1.1 ms, C = 0.7 ms giving an absolute maximum throughput of 1100 req/sec approximately.

TWO CONTROLLER SYSTEM

Table 2 gives the estimated service time for the various messages passed in FIG. 18, and shows the mean service time for control messages in the two controller systems.

TABLE 2

| Message | Service Time |
|---|---|
| Allocate request (two controller) | 260 μs |
| Summary bit/allocate | 300–460 μs |
| Allocate (own controller) | 1200 μs |
| Summary bit section | 390 μs |
| Clear request (two controller) | 360 μs |
| Clear command (controller-controller) | 360 μs |
| Clear response (controller-controller) | 120 μs |
| Clear request (own controller) | 800 μs |

The mean service time per message = 480 μs approximately giving an absolute maximum throughput of around 2,100 req/sec.

It is clear that a multicontroller system offers a very high potential throughput.

COMPARISON OF SINGLE CONTROLLER AND MULTICONTROLLER SYSTEMS RESPONSE AND THROUGHPUT

The control traffic intensity is defined to be the ratio of the rate of work into the switch and the mean service time available to the switch.

This quantity determines the absolute maximum throughput of the control traffic intensity.

The absolute maximum throughput is given by p = 1 and p < 1 for normal working.

Now the control traffic intensity is approximately inversely proportional to the number of controllers in the system and so a multicontroller system offers a high throughput.

There are three main factors affecting the response time:
 i. Processing periods.
 ii. Message transmission times which is taken to be negligible.
 iii. Queueing overheads.

The queueing overheads are primarily determined by p the control traffic intensity, and is depicted in FIG. 19 for a single controller system and FIG. 20 for a multicontroller system.

It can be seen that the message for the single controller queue just once in a queue of traffic intensity p. The order of queueing for an allocate and clear in a multicontroller system is shown by the numbered arrows.

For both requests messages are queued three times in queues of traffic intensity p/m.

For low requests rates the queue overheads, and hence the overall response is marginally better in the single controller system. However, as the control traffic intensity tends to one of the queue overheads in the single system this will increase and exceed the three queueing overheads in the multicontroller system. This follows directly from the fact that the single controller system throughput capacity is much lower. In fact it is the case that the response time of a single controller running at near its absolute maximum throughput will be higher than for several such controllers sharing requests at the same total traffic load. Thus the multicontroller system offers a high throughput with comparitively short response time, for high traffic loads. By using sufficient controllers virtually any throughput capacity can be achieved.

The flexibility of the multicontroller system enables the control requirements of a switch to be met economically. Small switches do not carry the cost penalty of the large control throughput capacity necessary in large switch sizes because additional controllers are used according to the switch size, allowing linear equipping of control capacity with switch size.

CONTROL COMMUNICATION

The control hardware consists of a number of controllers and their interfaces to the switchblock and the exchange central control processor clusters. To perform their function the controllers need to be connected to each other and to all the interfaces.

FIG. 21 shows the typical communication paths required by the control function. Sixty-four cables connect the processor interface buffers PIB0–7 and the controllers C0–C3, and there are twelve inter controller cables. Thirty-two cables connect the controllers C0–C3 and the central switches CS0–CS3. Control communication from the central switches CS0–CS3 to the outer switches OS0–OS47 is provided via switch block cables. The outer switches OS0–OS47 extend to 3072 digital line terminations DLT's. The number of cables shown is one hundred and eight and includes duplicated cables to provide security against faults. The interconnection of cables to produce these paths can give rise to problems. The first problem is the large number of cables needed to be terminated at the controllers. This increases the physical size of the controllers. The second problem is the total number of cables needed for the interconnections.

A solution to these problems is to connect the controllers and interfaces in a loop as shown in FIG. 22 which uses only thirty-two cables. Unfortunately a loop intercontroller communication system can suffer from the following problems:

i. A contention problem exists when controllers need to send a message on to the loop. It may need to wait for a free slot on the loop.
ii. It is difficult to synchronise a large loop, i.e. to indicate to a controller when there is a free slot on the loop to be used.
iii. A loop structure is difficult to grow to include more controllers and interfaces.
iv. A loop structure has a problem with reliability, any single failure on the loop causes all the loop to fail.
v. In some loop systems there is a long propagation delay around the loop.
vi. Some loop systems have a message throughput problem. These problems do not exist or can be overcome by the control highway described below. A method of one controller communicating with another controller is to broadcast a message containing a destination address to all controllers, as shown in FIGS. 23 and 24.

The only controller that actions the message is the one that is identified by the destination address. The data transmitter transmits the message, shown in FIG. 24, containing a destination address. A data receiver Rx will always accept the message if the destination address identifies that controller. FIG. 25 shows how a number of broadcast communication links shown in FIG. 23 can be interconnected by a multipaired cable. In this form it is called a Control Highway.

DESCRIPTION OF CONTROL HIGHWAY

The following items make up the control highway as shown in FIG. 25.

a. Controllers, C

The controllers C connected to the highways are triplicated. These controllers are run asynchronously and are resynchronised on input and output. The controllers in a triplicated set receive their inputs synchronously from the Queue Selector QS. They are also resynchronised when outputting to the data transmitter, Tx.

b. Data Transmitter, Tx

The data transmitter Tx receives data from the triplicated controllers C, performs the resynchronisation of the controllers and majority votes the data before broadcasting the data on to the serial control highway associated with that controller.

c. Data Receiver and Queueing, RQ

A data receiver monitors the messages on a serial control highway from a controller. When a message passes by for the controller with which it is associated, it will copy that message into its queue.

d. Queue Selector, QS

The queue selector QS scans around the queues looking for messages, once a message is found it is sent to the three controllers synchronously. Consider a message being passed from Controller A to Controller D, the following sequence occurs:

i. Controllers at A checks for outstanding message accept from Controller D. If a message accept reply is outstanding, the controller A waits for a reply or a timeout.
ii. Controllers at A formats the message preceded by a destination address and followed by a checkcode.
iii. Controllers at A resynchronised by a handshake with the majority votes and transmitter.
iv. Controllers at A sends the message to the transmitter where the data is majority voted before transmitting on to the serial control highway. No contention exists for sending a message on to the serial control highway because only one transmitter is connected to any one link on the highway.
v. Receivers at Controller C and B detect a message on the serial highway from A, but the message is ignored because the address does not match.
vi. Receiver at Controller D detects a message on the serial link and because the address matches, the message is stored in the queue.
vii. As the queue selector at Controller D scans around the receiving queues, it will find the message from controller A. The message will then be passed on to the controller using a handshake which will resynchronise the controller at D.
viii. The controller at D will validate the checkcode. If the checkcode is invalid, a fault analysis action is started. If the checkcode is valid then a message accepted response is sent to Controller A using a similar sequence described above in (ii and vii). The message accept, when received at Controller A will enable further messages to be sent from A to D. If a reply is required to the A and D messages then the message accept can be replaced by the reply message in the protocol.

Each cable link on the Control Highway will use a ten pair cable. The pairs within this cable are used as follows:

| 1 pair | bit clock signal | these signals are used for retiming only |
|---|---|---|
| 1 pair | frame reference signal | |
| 8 pairs | 4 Mb/s communication links. (a multiplex of 2 × 2MB/s communication links.) | |

The retiming is done in a similar way to that used in the switch block. The eight pairs at 4 Mb/s are used as sixteen links at 2 Mb/s, each of these links can be used as a broadcast communication link for one controller. This allows sixteen controllers or interfaces to be connected on to a control highway.

RELIABILITY AND SECURITY

To meet reliability requirements the loop must be secured by duplication. The messages are transmitted around the loops in different directions which gives the following advantages:

i. A fault in both loops only causes partial loss of service as shown in FIG. 26. Controllers 3 and 4 can communicate with each other in both directions and controllers 1, 2, 5 and 6 can communicate with each other in both directions.

ii. Growing loops is made easy shown in FIG. 27. The growth sequence is as follows:
 (a) Ensure all link interfaces are 'in service',
 (b) remove links A and B. Using both loops controllers 1-6 can still communicate.
 (c) add links C, D, E and F.

The control communication highway described above, solves the problems associated with a conventional loop communication highway, but retains the advantages in terms of the low number of cables used.

The control communication highway is only suitable for use between controllers, peripheral interface buffer and central switch modules. The control communication to outer switch modules is via the central switch module, then via the frame start wire in the switch block cable to the outer switch module.

We claim:

1. A digital switchblock, for use in telecommunications equipment including a plurality of processor clusters each serially connected to a respective controller by way of a respective peripheral interface buffer, wherein the switchblock is connected for communication through PCM channels with all the controllers, and the switchblock comprises:

a plurality of receive digital switching modules connected to the incoming PCM transmission channels, a plurality of transmit digital switching modules connected to the outgoing PCM transmission channels; and, a plurality of central digital switching modules to which all said controllers are connected, and arranged so that, the interconnection between one of said plurality of receive digital switching modules and one of said plurality of transmit digital switching modules is set up by way of one of said plurality of central digital switching modules by use of a plurality of control switch state maps, stored in the controllers, which depict the current state of all digital switching modules and identify a connection path through the digital switchblock.

2. A digital switchblock as claimed in claim 1 wherein a control switch state map is provided in the form of one summary map for each receive and transmit digital switching module pair which depicts the busy/idle states of the paths between the digital switching module pair and the central digital switching modules, the map includes one summary bit which represents the path to each central digital switching module which is set to indicate a busy state if there are no transmission time slots available to establish a communication path to the central digital switching module.

3. A digital switchblock as claimed in claim 2 wherein the summary maps for two corresponding receive and transmit digital switching module pairs are compared and paths are set up if the corresponding central digital switching modules are idle.

4. A digital switchblock as claimed in claim 1 wherein a control switch state map is provided, at each PCM channel location, in the form of a PCM channel ordered map including a busy bit used to indicate whether the PCM channel is in use, an identifier to indicate the transmission time slot the PCM channel is using, and a path collision bit used to indicate the possibility of a collision if a further path is connected to the PCM channel.

5. A digital switchblock as claimed in claim 1 wherein a control switch state map is provided, at each time slot location, in the form of a slot ordered map including a busy bit indicating whether the slot is in use, an identifier to indicate the PCM channel connected at the other end of the path, two reserved bits providing an indication whether go and return paths are reserved or enabled, and a link list for use with multiple connection configuration.

6. A digital switchblock as claimed in claim 1 wherein the controllers are connected in double-loop serial configuration and further controllers can be connected to the switchblock loop by breaking the loop connections between adjacent controllers and inserting and connecting the additional controller.

* * * * *